United States Patent [19]

Amaria et al.

[11] 4,019,224
[45] Apr. 26, 1977

[54] REMOVAL OF MEAT FROM CRUSTACEANS

[75] Inventors: Pesi Jal Amaria; Roy A. MacLellan; James W. Tucker, all of St. John's, Canada

[73] Assignee: Canadian Patents and Development Limited, Ottawa, Canada

[22] Filed: Sept. 18, 1975

[21] Appl. No.: 614,492

[52] U.S. Cl. ..................................... 17/71
[51] Int. Cl.² ............................... A22C 29/02
[58] Field of Search ............ 17/71, 48, 58, 59, 72, 17/73; 99/576

[56] References Cited

UNITED STATES PATENTS

| 2,893,052 | 7/1959 | Schlichting | 17/59 |
| 3,596,310 | 8/1971 | Tolley | 17/71 |
| 3,787,928 | 1/1974 | Domecki | 17/71 |
| 3,925,846 | 12/1975 | Leander | 17/59 |

FOREIGN PATENTS OR APPLICATIONS

| 1,117,939 | 5/1956 | France | 17/58 |
| 1,454,049 | 6/1967 | Germany | 17/71 |
| 1,121,626 | 7/1968 | United Kingdom | 17/58 |
| 1,321,949 | 7/1973 | United Kingdom | 17/71 |

*Primary Examiner*—Louis G. Mancine
*Assistant Examiner*—James D. Hamilton
*Attorney, Agent, or Firm*—Ronald G. Bitner

[57] ABSTRACT

An apparatus for the removal of meat from Crustacean members having tubular shells, particularly crab legs. The apparatus comprises a shell slitting device including an eccentric rotary cutter and a stationary cutter. The stationary cutter includes an elongated guide member which is introduced into an open end of the tubular shell between the meat and the shell. Also described is a conveying apparatus and a device for opening the slit shells for the removal of the meat.

7 Claims, 9 Drawing Figures

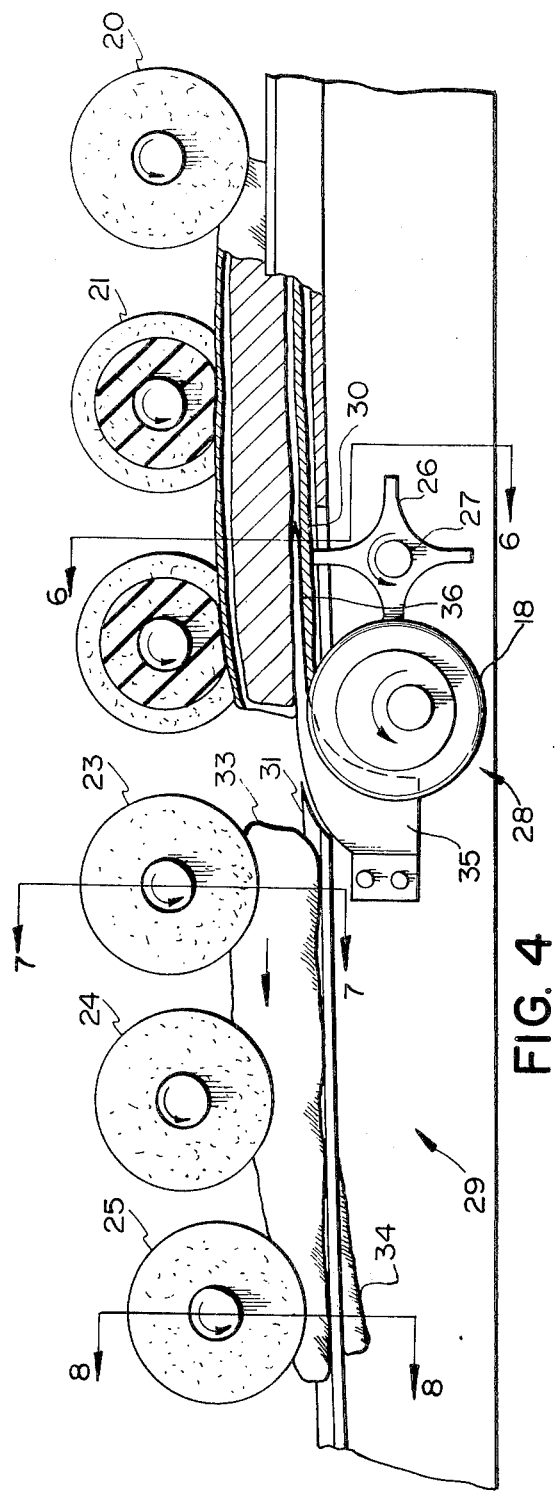
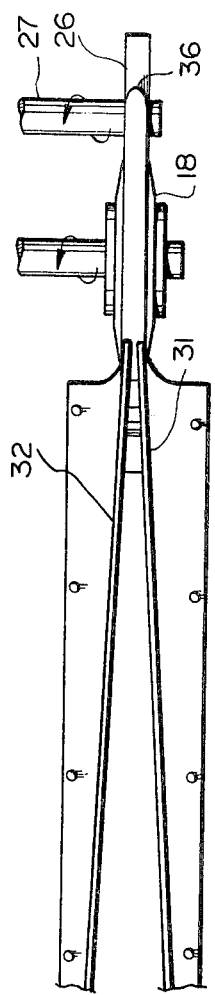
FIG. 4
FIG. 5

REMOVAL OF MEAT FROM CRUSTACEANS

BACKGROUND OF THE INVENTION

This invention relates to the removal of meat from Crustacean members having tubular shells, and particularly crab legs.

The present common method of removing meat from crab legs is to manually shake them out. The crab is slaughtered on a knife edge into two sections, cleaned, washed, cooked, and cooled rapidly in cold water. Each of the two sections comprises a half body shoulder and five legs including the claw. After shaking the meat out of the body shoulder, the legs are separated from the body and prepared for shaking.

The meat from the crab leg is a slender piece of meat which is about 4 to 5 times more valuable if unbroken. With manual shaking, the breakage can be due to several reasons. Overcooking makes the meat fibers tender and easily broken. Undercooking results in the meat sticking to the shell. In large scale continuous production, it is difficult to cook each leg to the optimum temperature and for the right amount of time, particularly because of variations in hardness of the shells. It is normally difficult to extract meat from the shell by shaking. To facilitate removal, it is common practice to enlarge the opening of the shell by blows with a tool which further contributes to damaging of the meat.

Methods other than manual shaking have been proposed and tried, including blowing out the meat with water, drawing out with vacuum, squeezing out with rollers, and the use of centrifugal force. However, these methods have no significantly reduced meat breakage. The use of rollers also results in discoloration of the meat due to removal of some of the pigment from the surface of the meat. Apparatus using serreated cutters for cutting the shells of Crustaceans have been proposed. However, these are not entirely satisfactory either, as serrated cutters leave bits of shell embedded in the meat.

SUMMARY OF THE INVENTION

An object of the present invention is to provide an apparatus for the removal of meat from Crustacean members having tubular shells.

Another object of the present invention is to remove meat from shelled Crustacean members with significantly reduced meat breakage or damage.

A specific object of the present invention is to provide an apparatus for slitting the shells of Crustacean members.

The present invention provides an apparatus for longitudinally slitting a tubular shell of a Crustacean member, comprising: guide means for longitudinally guiding the shell members, the guide means defining an opening; a shell slitting device comprising a fixed cutting member and an eccentric rotary cutter disposed in the opening, the fixed cutting member having an elongated guide element disposed substantially parallel to the guide means and operative to be introduced between the meat and shell of the Crustacean member, the eccentric rotary cutter being disposed adjacent to the fixed cutting member and operative upon rotation in association with the fixed cutting member to shear the shell longitudinally as the Crustacean member is moved along the guide means to the shell slitting device.

The present invention further comprises means for conveying the Crustacean member to the shell slitting device.

The present invention also commprises means for opening the slit shell for the removal of the meat.

BRIEF DESCRIPTION OF THE DRAWINGS

FIG. 4 is a schematic, partly sectional elevation of an apparatus in accordance with the present invention for conveying, slitting and opening a tubular Crustacean shell member for the removal of meat.

FIG. 5 is a top schematic view of a portion of the shell opening apparatus, of FIG. 4, showing the diverging spreading member.

DESCRIPTION OF THE PREFERRED EMBODIMENTS

Figure 1:
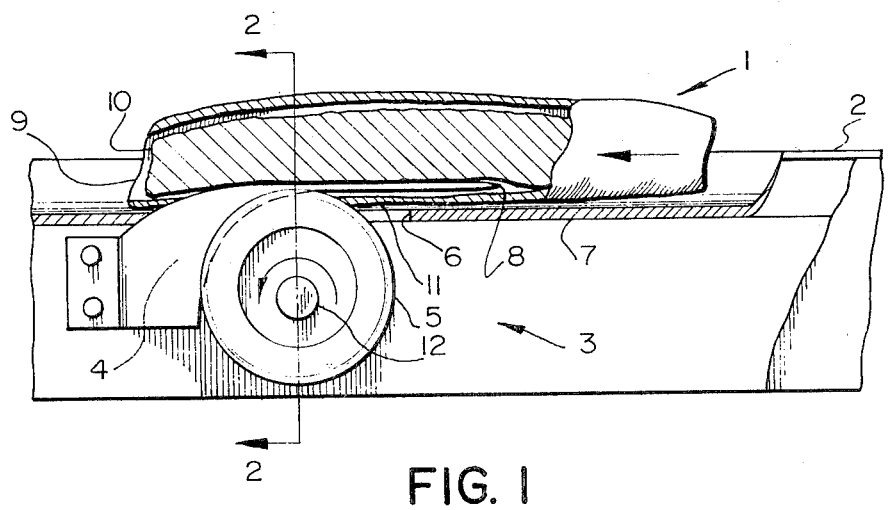
FIG. 1 is a schematic, partly sectional elevation of an apparatus in accordance with the present invention for slitting the tubular shell of a Crustacean member.
Figures 2, 3:
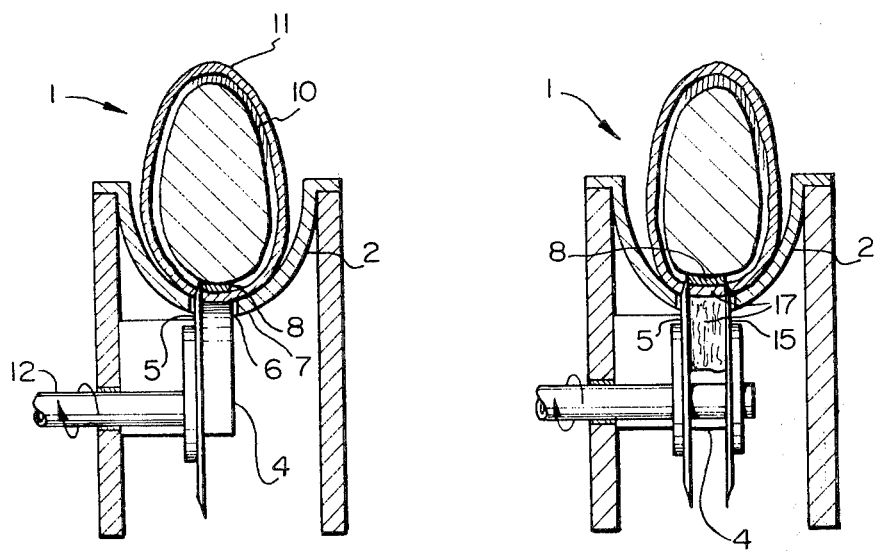
FIGS. 2 and 3 are sectional views taken at 2—2 of FIG. 1 illustrating embodiments of the invention with one and two rotary cutters, respectively.

Referring to FIGS. 1 and 2, the apparatus of the present invention comprises guide means 2 for longitudinally guiding the tubular Crustacean member 1, specifically a crab leg; and a shell slitting device 3 comprising a fixed cutting member 4 and an eccentric rotary cutter 5. The guide means 2 shown is in the form of a U-shaped member having an opening 6 at its base 7. Disposed in the opening is a fixed cutting member 4 which includes an elongated guide element 8 that is disposed substantially parallel to, and above base 7 of the guide member 2. Disposed adjacent to the fixed cutting member 4 is an eccentric rotary cutter 5.

In operation, the tubular Crustacean member 1 is moved along the guide member 2, either manually or with the use of suitable mechanical conveyer means, described hereinafter. As the Crustacean member 1 is moved towards the slitting device 3, the elongated guide element 8 enters the opening 9 of the tubular member between the meat 10 and the shell 11. The elongated element also lifts the meat 10 from the shell 11 preventing the rotating cutter 5 from cutting the meat. Cutting of the shell is effected upon rotation of the eccentric cutter 5 in conjunction with the stationary cutter 4 with a series of changing shear angles between the cutting surfaces of the rotary and stationary cutters.

The apparatus illustrated in FIG. 2 results in a slit along the length of the shell. With the addition of a second cutter 15 on the opposite side of the stationary cutter 4, as shown in FIG. 3, two slits are produced which when completed separates a strip of shell 17. The resulting opening facilitates removal of the meat, either by manual means, or by mechanical means to be described.

The means for conveying the Crustacean member may comprise any suitable means such as rollers or belts. In the embodiment of FIGS. 4 to 8, the conveying means comprises a plurality of driving rollers 20 to 25 and a toothed feeder wheel 26. The driving rollers may be made of resilient material or be resiliently mounted to accommodate variations in shell size. The feeder wheel 26 is mounted on a floating shaft 27 and biased upwardly against the shell 30, and serves to facilitate moving the Crustacean member into the slitting device 28. Alternatively, the feeder wheel may comprise a resilient roller mounted on a fixed shaft.

The meat may be separated from the shell by various methods. For example, using the apparatus as illustrated in FIGS. 1 and 2, the crab leg may be slit on opposite sides of the shell by passing twice through the apparatus, or passing through a second similar apparatus disposed on the opposite side, leaving two separated half shell sections. The meat can then be easily removed, or alternatively, the meat can be retained on one of the half shells.

Figure 8:
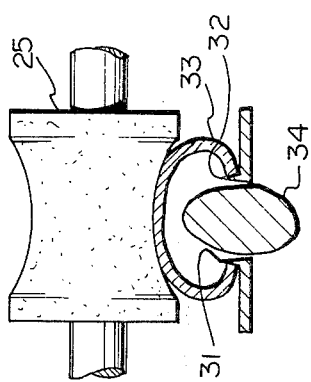
FIGS. 6, 7, and 8 are sectional views of the apparatus of FIG. 4 taken at 6—6, 7—7, and 8—8, respectively.
Figure 7:
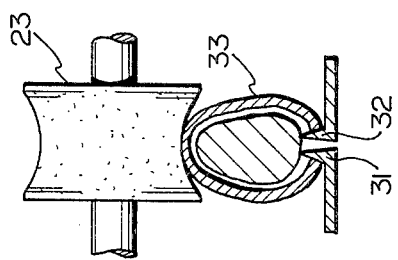
Figure 6:
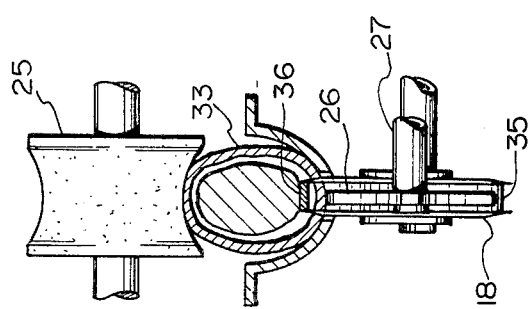

FIGS. 4 to 8 illustrate an apparatus which separates the meat from the shell in a continuous operation. After passing through the slitting device 28, the shell is conveyed onto a shell opening device 29 comprising a pair of diverging spreading elements 31 and 32 and a plurality of driving rollers 23, 24, and 25. In addition to moving the Crustacean members, the rollers 23, 24, and 25 are disposed to press down on the shell 33. FIGS. 7 and 8 illustrate the opening operation. In FIG. 7, spreading of the slit shell 33 has just begun. At FIG. 8, the combined effect of the spreading elements 31 and 32 and the rollers 25, have opened the shell 33 sufficiently to allow the meat 34 to fall from the shell.

Figure 9:
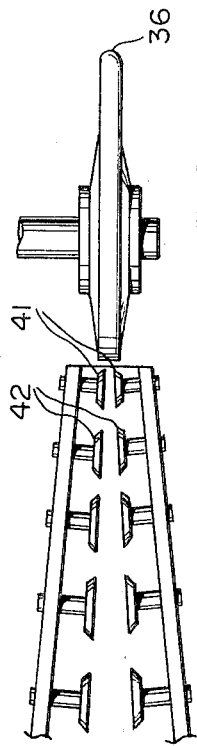
FIG. 9 is a top schematic view of an alternative to the shell opening apparatus of FIG. 5.

FIG. 9 illustrates an alternative to the diverging spreading elements shown in FIG. 5, and comprises a plurality of pairs of spreading rollers 41, 42, etc., with progressively increasing spacing to effect separation of the slit shell. Other aspects of the apparatus may remain as shown in FIG. 4.

Referring to FIGS. 1 and 2, although any suitable eccentric cutter may be used, the cutter will preferably by a circular cutter 5 that is eccentrically mounted with respect to the rotating shaft 12. This arrangement allows exposing new shell cutting surfaces by partial rotation of the cutter relative to the shaft to prolong the cutting life of the rotary cutter.

Although the drawings illustrate specifically a crab leg, it will be understood that the present invention is suitable for any Crustacean member having a tubular shell, such as the legs and claws of lobsters; the bodies, legs and claws of cray fish; and the bodies of shrimp.

What is claimed is:

1. An apparatus for the removal of meat from a Crustacean member having a tubular shell, comprising:
    a. guide means for longitudinally guiding the Crustacean member, said guide means defining an opening;
    b. a shell slitting device comprising a fixed cutting member and an eccentric rotary cutter disposed in the opening, said fixed cutting member having an elongated guide element disposed substantially parallel to the guide means and operative to be introduced between the meat and shell of the Crustacean member, said eccentric rotary cutter disposed adjacent to the fixed cutting member and operative upon rotation in association with the fixed cutting member to shear the shell longitudinally as the Crustacean member is moved along the guide means into the shell slitting device.

2. The apparatus of claim 1 including conveying means for moving the Crustacean member to the shell slitting device.

3. The apparatus of claim 2 wherein the conveying means includes a rotating feeding wheel disposed below the elongated member, said feeding wheel being resiliently biased towards the elongated member.

4. The apparatus of claim 1 having two eccentric rotary cutters disposed on opposite sides of the fixed cutting member.

5. The apparatus of claim 1 further comprising a shell opening device comprising a pair of diverging shell spreading elements operative to be inserted into a longitudinally slit shell and to open the shell as the Crustacean member is moved along the diverging spreading elements.

6. The apparatus of claim 5 further comprising conveying means for moving the Crustacean member over the diverging spreading elements.

7. The apparatus of claim 6 wherein the conveying means comprises means for urging the Crustacean member towards the spreading elements.

* * * * *